(12) United States Patent
Elad et al.

(10) Patent No.: US 12,400,041 B2
(45) Date of Patent: Aug. 26, 2025

(54) MEMORY SYSTEM VERIFICATION

(71) Applicant: Arm Limited, Cambridge (GB)

(72) Inventors: Yuval Elad, Cambridge (GB); Jason Parker, Sheffield (GB)

(73) Assignee: Arm Limited, Cambridge (GB)

( * ) Notice: Subject to any disclaimer, the term of this patent is extended or adjusted under 35 U.S.C. 154(b) by 276 days.

(21) Appl. No.: 17/906,815

(22) PCT Filed: Feb. 5, 2021

(86) PCT No.: PCT/GB2021/050253
§ 371 (c)(1),
(2) Date: Sep. 20, 2022

(87) PCT Pub. No.: WO2021/191578
PCT Pub. Date: Sep. 30, 2021

(65) Prior Publication Data
US 2023/0140975 A1    May 11, 2023

(30) Foreign Application Priority Data
Mar. 25, 2020   (GB) ..................................... 2004328

(51) Int. Cl.
*G06F 21/60*     (2013.01)
*G06F 12/14*     (2006.01)
(Continued)

(52) U.S. Cl.
CPC .............. *G06F 21/78* (2013.01); *G06F 21/54* (2013.01); *G06F 21/606* (2013.01)

(58) Field of Classification Search
CPC ........ G06F 21/78; G06F 21/54; G06F 21/606; G06F 21/57; G06F 21/71;
(Continued)

(56) References Cited

U.S. PATENT DOCUMENTS

2008/0034350 A1* 2/2008 Conti ...................... G06F 21/74
                                                                717/124
2008/0276051 A1* 11/2008 Renno ................. G06F 12/1441
                                                                711/154
(Continued)

FOREIGN PATENT DOCUMENTS

| CN | 111159097 A | 5/2020 |
|----|-------------|--------|
| TW | 201923595 | 6/2019 |
| TW | 201935304 | 9/2019 |

OTHER PUBLICATIONS

Office Action for TW Application No. 110108107 dated Sep. 3, 2024 and English translation, 54 pages.

*Primary Examiner* — Vu V Tran
(74) *Attorney, Agent, or Firm* — NIXON & VANDERHYE P.C.

(57) ABSTRACT

There is provided a data processing apparatus, which is suitable for verifying memory systems. Processing circuitry issues a plurality of memory access requests to a plurality of addresses in a memory. Point-of-trust circuitry receives the memory access requests from the processing circuitry via a first set of intermediate circuits. Secure channel circuitry enables secure communication of a correspondence between the plurality of addresses from the processing circuitry to the point-of-trust circuitry. The point-of-trust circuitry determines whether the addresses in the memory of the memory access requests received via the first set of intermediate circuits have a predetermined relationship based on the correspondence.

19 Claims, 7 Drawing Sheets

(51) Int. Cl.
  *G06F 21/54*   (2013.01)
  *G06F 21/57*   (2013.01)
  *G06F 21/71*   (2013.01)
  *G06F 21/78*   (2013.01)
  *G11C 29/02*   (2006.01)
  *G11C 29/24*   (2006.01)
  *G11C 29/44*   (2006.01)
  *H04L 9/40*    (2022.01)

(58) Field of Classification Search
  CPC ......... G06F 2212/1052; G06F 12/1416; G06F 12/14; G11C 29/022; G11C 29/44; G11C 29/025; G11C 29/24; G11C 2029/4402; H04L 63/0428; H04L 63/062
  See application file for complete search history.

(56) References Cited

U.S. PATENT DOCUMENTS

| | | |
|---|---|---|
| 2010/0131810 A1 | 5/2010 | Thayer et al. |
| 2012/0216002 A1* | 8/2012 | Moyer ................ G06F 12/1416 711/E12.091 |
| 2014/0223052 A1* | 8/2014 | Chavali ............... G06F 13/4221 710/110 |
| 2016/0285631 A1* | 9/2016 | Deleeuw ............. H04L 67/1001 |
| 2017/0003896 A1* | 1/2017 | Seppanen ............ G06F 3/0689 |
| 2019/0042729 A1* | 2/2019 | Desai .................... G06F 13/382 |

\* cited by examiner

MEMORY SYSTEM VERIFICATION

The present technique relates to data processing systems. In particular, the present technique has relevance to the field of memory systems and particularly their verification.

In a data processing system, different components could be produced by different manufacturers and combined to produce a single system (such as a System-on-Chip or SoC). The situation can therefore occur in which one component must trust a second component, even though the second component (let alone its trustworthiness) may be unknown when the first component was designed. This is particularly problematic in secure systems where the integrity or security of data could be compromised by a malicious third party or a poorly programmed component.

Viewed from a first example configuration, there is provided a data processing apparatus comprising: processing circuitry adapted to issue a plurality of memory access requests to a plurality of addresses in a memory; point-of-trust circuitry to receive the memory access requests from the processing circuitry via a first set of intermediate circuits; and secure channel circuitry to enable secure communication of a correspondence between the plurality of addresses from the processing circuitry to the point-of-trust circuitry, wherein the point-of-trust circuitry is adapted to determine whether the addresses in the memory of the memory access requests received via the first set of intermediate circuits have a predetermined relationship based on the correspondence.

Viewed from a second example configuration, there is provided a data processing method comprising: issuing a plurality of memory access requests to a plurality of addresses in a memory; receiving the memory access requests from the processing circuitry via a first set of intermediate circuits at point-of-trust circuitry; and enabling secure communication of a correspondence between the plurality of addresses from the processing circuitry to the point-of-trust circuitry; and determining whether the addresses in the memory of the memory access requests received via the first set of intermediate circuits have a predetermined relationship based on the correspondence.

Viewed from a third example configuration, there is provided a data processing apparatus comprising: means for issuing a plurality of memory access requests to a plurality of addresses in a memory; means for receiving the memory access requests from the processing circuitry via a first set of intermediate circuits; and means for enabling secure communication of a correspondence between the plurality of addresses from the means for issuing a plurality of memory access requests to the means for receiving the memory access requests; and means for determining whether the addresses in the memory of the memory access requests received via the first set of intermediate circuits have a predetermined relationship based on the correspondence.

The present technique will be described further, by way of example only, with reference to embodiments thereof as illustrated in the accompanying drawings, in which.

Figure 2:
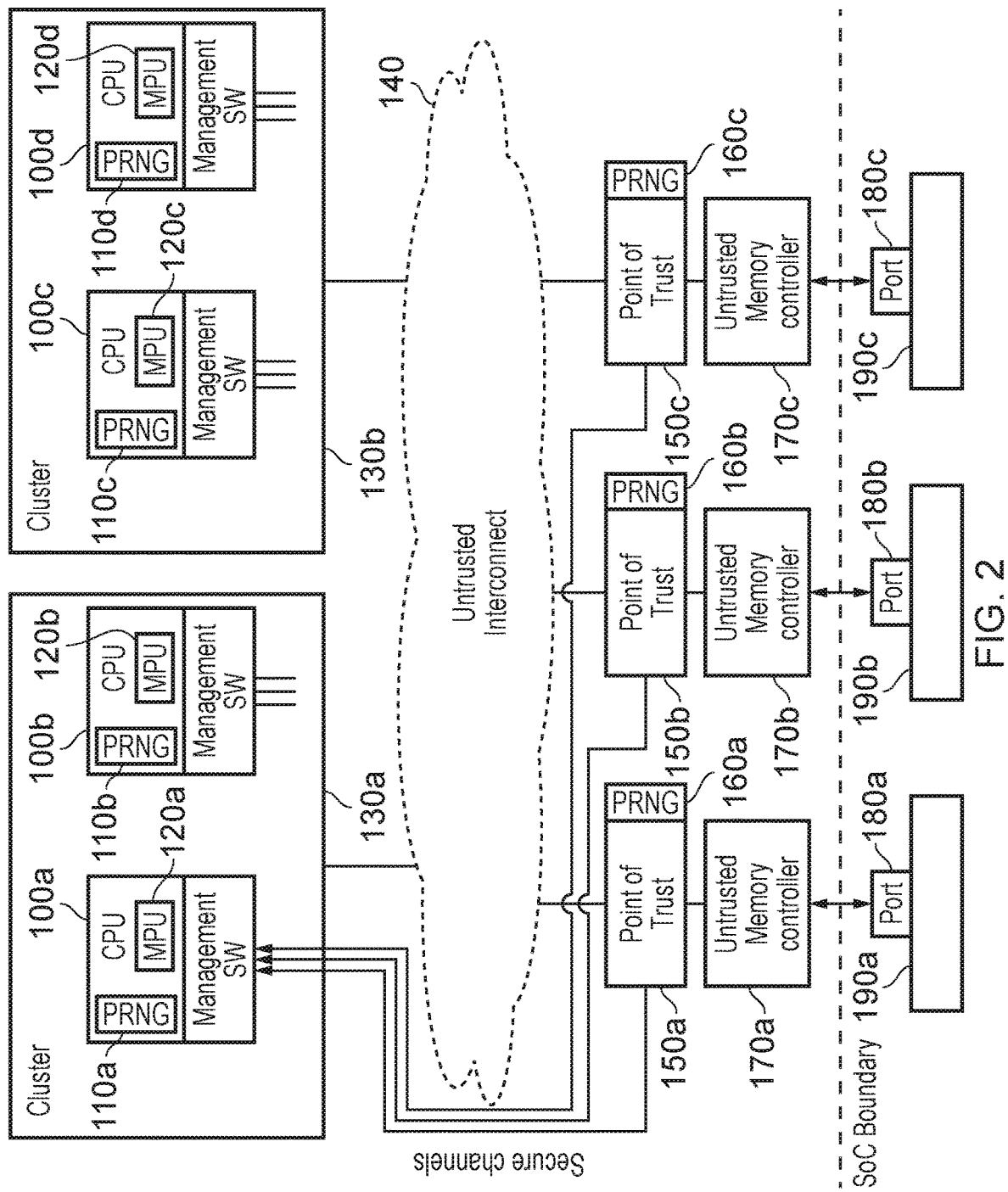
Figure 3:
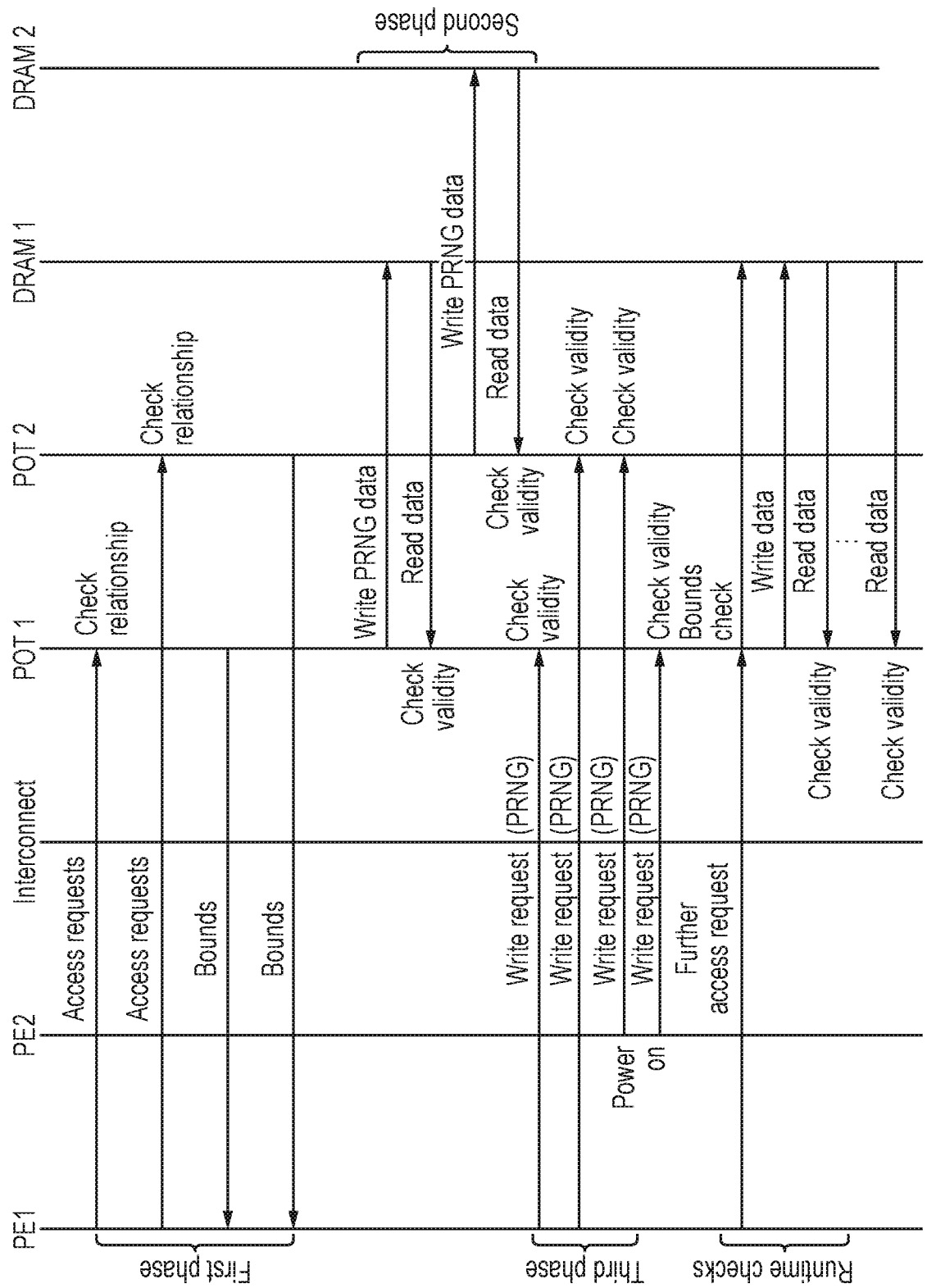
Figure 4:
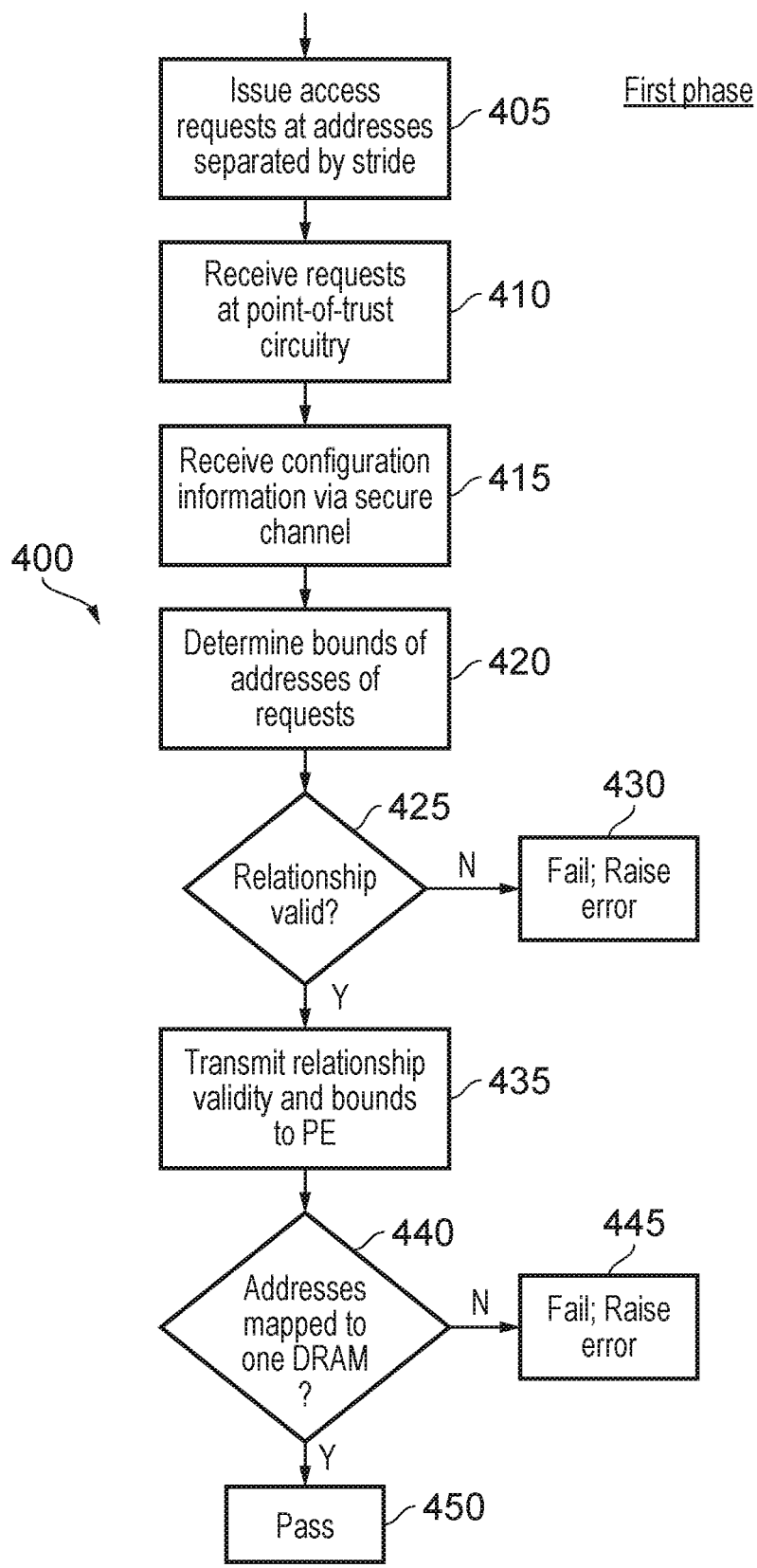
Figure 5:
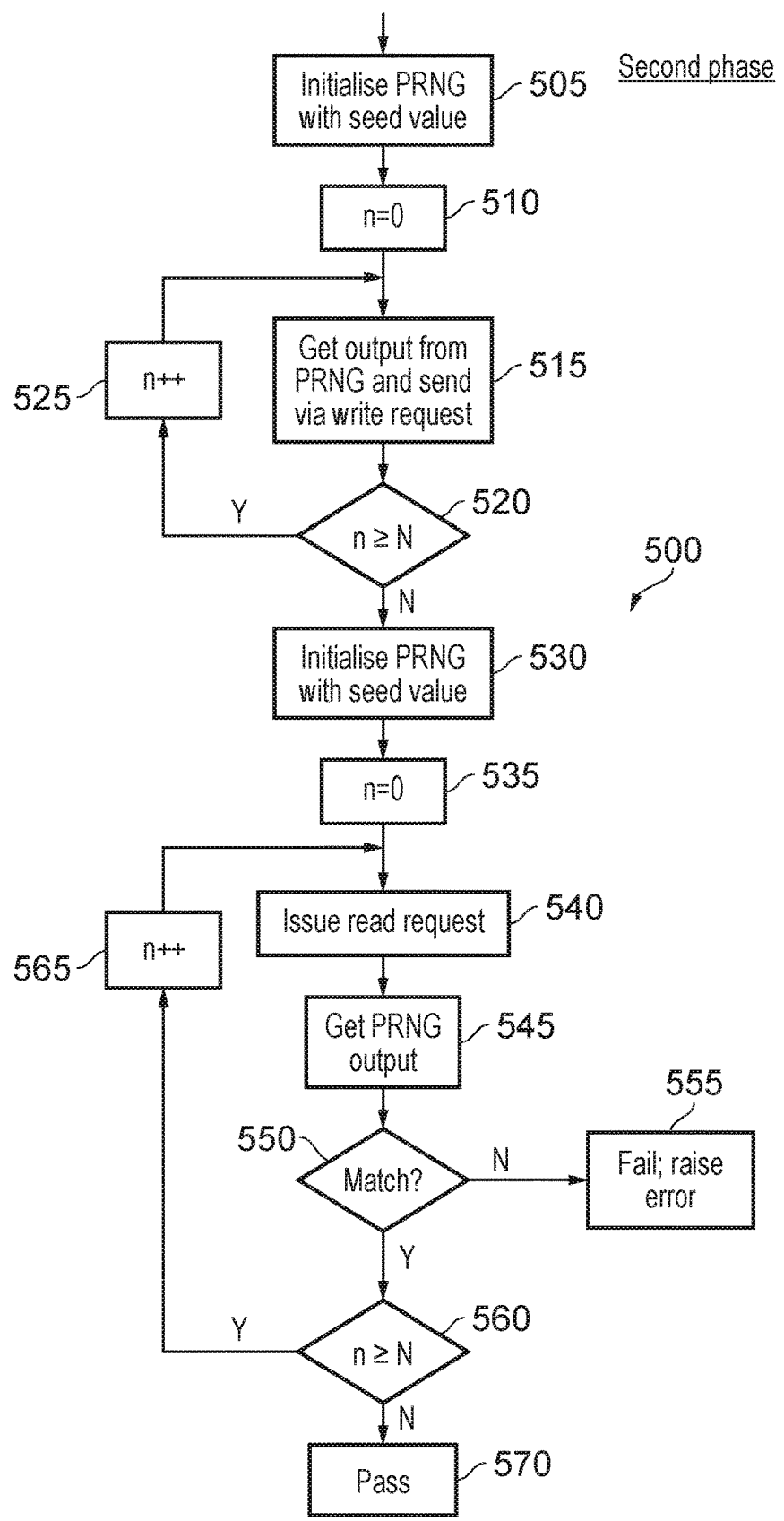
Figure 6:
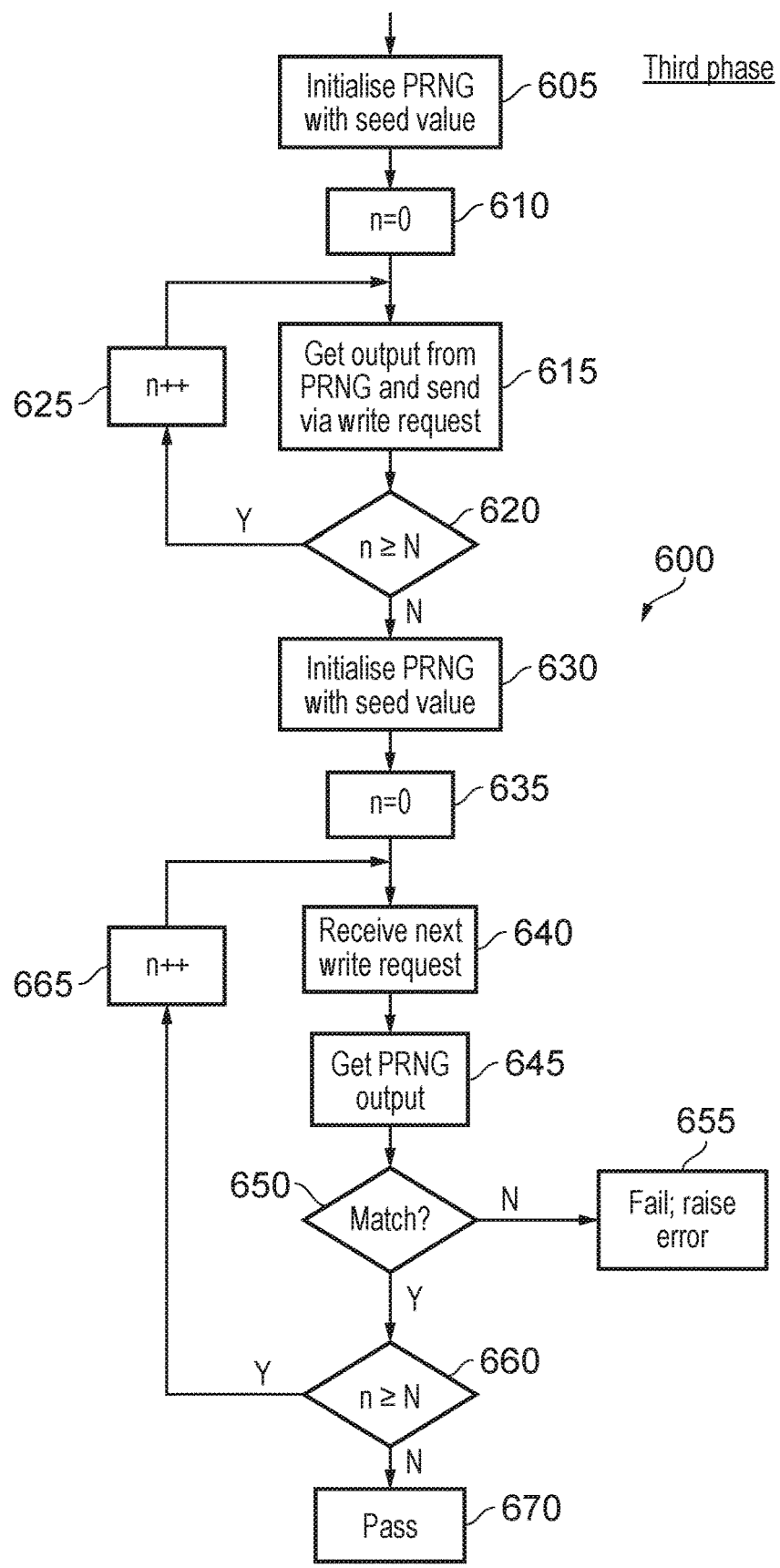
Figure 7:
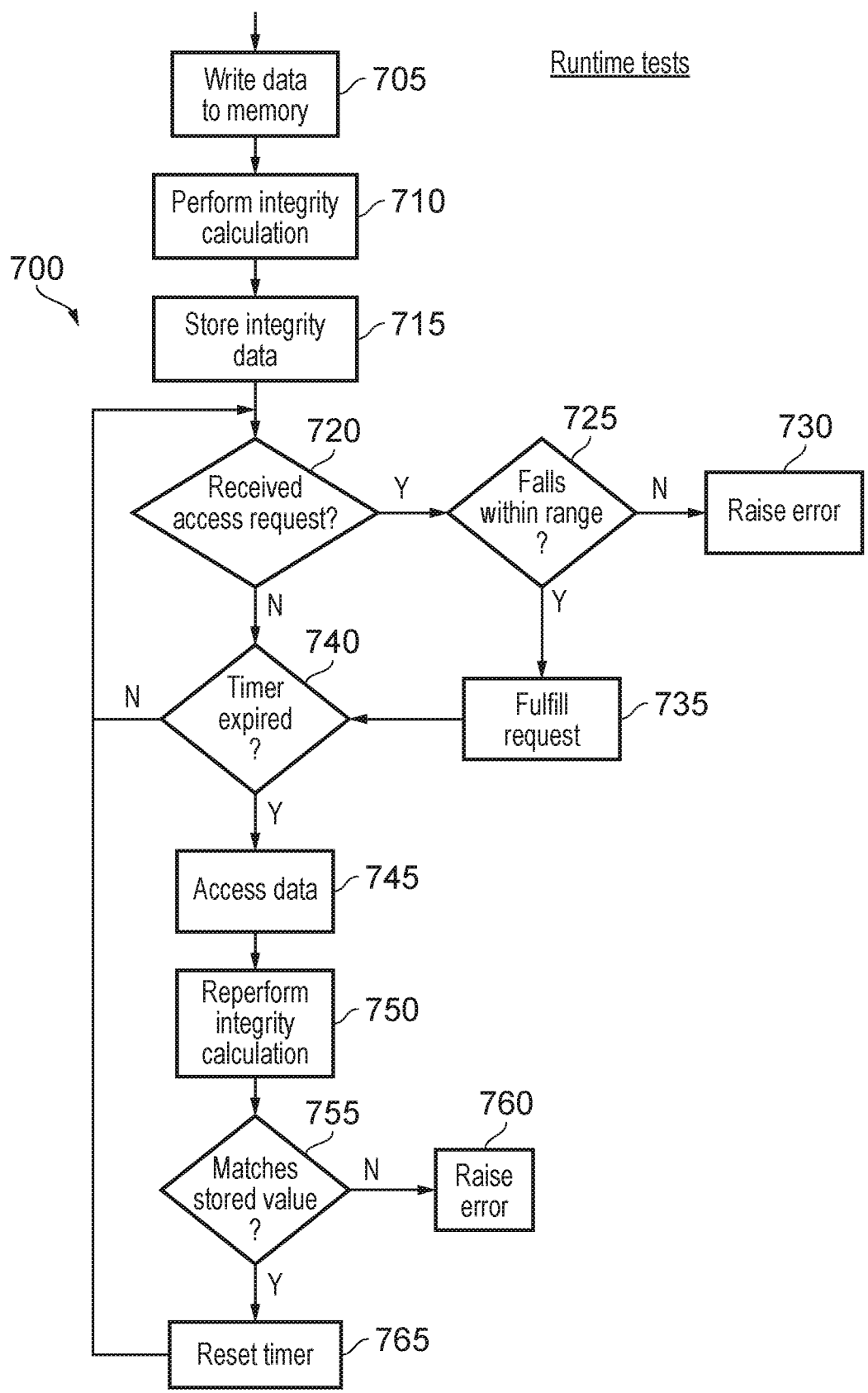

FIG. 2 schematically shows a System-on-Chip comprising an apparatus in accordance with some embodiments;

FIG. 3 illustrates an overview of the validation process in accordance with some embodiments;

FIG. 4 is of a flow chart that covers the first phase of the validation process in accordance with some embodiments;

FIG. 5 is of a flow chart that covers the second phase of the validation process in accordance with some embodiments;

FIG. 6 is of a flow chart that covers the third phase of the validation process in accordance with some embodiments; and FIG. 7 is of a flow chart that covers the runtime tests of the validation process in accordance with some embodiments.

Before discussing the embodiments with reference to the accompanying figures, the following description of embodiments and associated advantages is provided.

In accordance with one example configuration there is provided a data processing apparatus comprising: processing circuitry adapted to issue a plurality of memory access requests to a plurality of addresses in a memory; point-of-trust circuitry to receive the memory access requests from the processing circuitry via a first set of intermediate circuits; and secure channel circuitry to enable secure communication of a correspondence between the plurality of addresses from the processing circuitry to the point-of-trust circuitry, wherein the point-of-trust circuitry is adapted to determine whether the addresses in the memory of the memory access requests received via the first set of intermediate circuits have a predetermined relationship based on the correspondence.

The point-of-trust circuitry acts as a hardware agent intermediating the memory and the processing circuitry. By issuing a plurality of memory access requests having a predetermined correspondence to the memory, which are intercepted by the point-of-trust circuitry, it is possible to examine the memory access requests that have been intercepted and determine whether the same predetermined correspondence can be inferred. If the relationship between the intercepted memory access requests is such that the correspondence cannot be inferred, then it can be assumed that circuitry through which the memory access requests has passed (the first set of intermediate circuits) is not behaving correctly and might, for instance, be aliasing memory in order to gain access to secret or privileged data. The secure channel is used in order to convey the (true) correspondence from the processing circuitry to the point-of-trust circuitry so that the relationship can be examined. There are a number of ways in which the predetermined relationship could express the correspondence. In some embodiments, the relationship is the same as the correspondence. For instance, if the memory access requests are made with a particular stride, then the same stride could be expressed in the correspondence. In other embodiments the underlying memory might use memory striping in order to distribute the workload across multiple memories. In such situations, the addresses of the intercepted memory access requests will be a multiple of the stride value, with the multiple corresponding with the number of memories across which the memory access requests are distributed.

In some examples, data sent via the secure channel is unaffected by a configuration of the first set of intermediate circuits. There are a number of ways in which the secure channel can be implemented. In some examples, the secure channel avoids or does not make use of the first set of intermediate circuits so that the first set of intermediate circuits is unable to affect any communications sent along the secure channel. In other examples, the secure channel could make use of the intermediate circuits and instead use encryption, with each of the processing circuit and the point-of-trust circuitry having access to decryption keys that enable communications to be sent securely without being intercepted or modified by the intermediate circuits. In some examples, the secure channel uses the fabric of the intermediate circuit, but is not impacted by any software configuration of the intermediate circuit. For instance, communications sent by the secure channel could be unaffected by software configuration of the intermediate circuit that could impact normal memory accesses.

In some examples, the point-of-trust circuitry is adapted to determine a range of addresses of the memory to which the memory access requests are addressed and to provide the range of addresses to the processing circuitry via the secure channel; and the processing circuitry is adapted to determine, from the range of addresses, whether the memory comprises an invalid address. As the memory access requests are received by the point-of-trust circuitry, a range of memory addresses that are associated with the memory access requests is determined. This range could represent, for instance, a minimum address and a maximum address to which the memory access requests are addressed. This range of addresses is provided to the processing circuitry via the secure channel such that the range of addresses cannot be modified by any of the first set of intermediate circuits. Using this information, the processing circuitry determines whether the memory comprises one or more invalid addresses. In particular, the range of addresses that are determined by the point-of-trust circuitry may indicate that one or more addresses are not valid. This may be carried out using the range information from a single point-of-trust circuit or could be determined based on a number of ranges that are provided by a plurality of point-of-trust circuits.

In some examples, the invalid address is one to which multiple memories relate. One example of an invalid address is one in which multiple memories relate. In particular, if two point-of-trust circuits each indicate a range that overlaps, then multiple memories might cover the same address. This would be an indication of memory aliasing occurring in which, for instance, a secure area of memory is mapped onto a non-secure area of memory that can be accessed by a malicious agent. Note that there are valid circumstances in which the ranges could overlap. For instance, in a situation of memory striping, the bounds of the addresses accessed by each memory may overlap. However, even in this situation, no single address should be directed towards multiple memories.

In some examples, the invalid address is one to which no memory relates. Another example of an invalid address is one to which no memory relates. In particular, if the memory ranges provided by each of the point-of-trust circuits illustrate a number of gaps in the overall memory address space, then this indicates that particular addresses are not directed towards any particular memory. Such a situation may be considered to be sufficiently unusual that it should be flagged as an error. In particular, this situation could indicate that an attacker has directed the address to a private memory that the attacker can observe or modify. It can also indicate that the attacker has configured the interconnect to drop all writes to the location and to response with a constant value (e.g. 0) for all reads.

In some examples, the point-of-trust circuitry is adapted, in response to the point-of-trust circuitry receiving a further memory request to an address that falls outside the range of addresses, to signal an error. Having determined a range of memory addresses to which the memory associated with a point-of-trust circuit relate, if a later/further memory request is received by the point-of-trust circuitry for an address that falls outside this range, then this indicates that the intermediate circuitry that directed to the memory access request is not behaving correctly. In particular, this is because the point-of-trust circuitry is receiving memory access requests for memory that it does not control. This could be an indication of memory aliasing occurring and accordingly an error is signalled (e.g. by raising an exception or fault, or by disconnecting the intermediate circuits, or restricting their use).

In some examples, the data processing apparatus comprises: generation circuitry to generate a pseudo-random number based on a seed value, to perform an integrity check. The numbers produced by the generation circuitry are not truly random. In particular, the numbers that are produced have the appearance of randomness, but are based on the seed value that is provided. Consequently, although a series of outputs from the generation circuitry has the appearance of randomness, this randomness can be predicted or reproduced if the same seed value is provided. In this way, the generation circuitry can be used to perform an integrity check. This occurs because the output of the generation circuitry is not known, given that the seed value is not known to the intermediate circuitry. However, having generated a "random" series of numbers, the same series of numbers can be regenerated by restoring the seed value. Consequently, a set of "random" data can be produced, with the unpredictability of the output making it difficult for the data to be anticipated in advance. In order to check that the data has not been changed, it is only necessary to restore the seed value and to regenerate the outputs, comparing these to what was received. The two sets of numbers should match, since they were generated using the same seed value.

In some examples, the point-of-trust circuitry is adapted to forward the requests to the memory via a second set of intermediate circuits. Consequently, the point-of-trust circuitry not only intermediates the processing circuitry and the memory, but also intermediates the first set of intermediate circuits and the second set of intermediate circuits. This makes it possible for the point-of-trust circuitry to be involved in checking the validity of the first set of intermediate circuits and the second set of intermediate circuits. Note that where multiple point-of-trust circuits are provided, e.g. where multiple memory ports are tested, each point-of-trust circuit can forward requests via their respective second sets of intermediate circuits in parallel.

In some examples, the second set of intermediate circuits comprises a memory controller. A memory controller can provide one or more ports to which a memory such as a DRAM is connected. In particular, the memory controller could be responsible for receiving a memory request and sending a series of signals to the memory that correspond with a memory request in order to enact the request.

In some examples, the integrity check comprises a second set integrity check; and the point-of-trust circuitry is adapted to perform the second set integrity check on a predetermined address in the memory by: setting the seed value to a predetermined value, transmitting a memory write request comprising the pseudo-random number to the predetermined address via the second set of intermediate circuits, resetting the seed value to the predetermined value, transmitting a memory read request to the predetermined addresses in the memory via the second set of intermediate circuits, and comparing a result of the memory read request with the pseudo-random number. One of the checks included by the integrity check is a second set integrity check, which is responsible for checking the integrity of the second set of intermediate circuits. This is achieved by setting the seed value of the generation circuitry to a predetermined value. A memory write request is then transmitted by the point-oftrust circuitry to the memory via the second set of intermediate circuits. The write request is such that it causes a data value that is generated by the generation circuitry using the seed value to be written to memory. Having issued the write request, the seed value in the generation circuitry is reset to the predetermined value. Having reset the seed value, the next value generated by the generation circuitry will correspond with the data that was written to memory. Accordingly, when a memory read request is issued to the same address that was provided for the write request, the data that is returned should correspond with the next value obtained from the generation circuitry. The two values are compared in order to determine whether there is a match. If such a match occurs, this suggests that the integrity of the second set of intermediate circuits is intact, which verifies that the write request was complied with (e.g. that the correct data was written, without being modified). Since the data that is written is "random" it cannot be anticipated by the second set of intermediate circuits, which lack access to the seed value. However, since the generator is pseudo-random, the values can be recreated in order to test the values stored within the memory. This therefore does not necessitate keeping a copy of the generated values—instead only the seed value needs to be kept. As previously explained, it is possible for this test to be carried out in parallel across each point-of-trust circuit and its corresponding second set of intermediate circuits.

In some examples, the integrity check is performed for a plurality of addresses by performing a plurality of memory write requests including the memory write request, followed by a plurality of memory read requests including the memory read request; and the pseudo-random number is changed for each of the plurality of memory write requests and each of the plurality of memory read requests, based on the seed value. The integrity check can be performed by issuing a plurality of memory write requests. In this case, for each memory write request, a different value is obtained from the generation circuitry. Having performed the series of write requests, the seed value is reset and a corresponding series of read requests are issued to read the data back from the memory. The result of each of the read requests is then compared to each of the outputs of the generation circuitry to determine a match. If there is any non-match, then this indicates that the integrity of the second set of intermediate circuits is invalid.

In some examples, the integrity check comprises a first set integrity check; and the processing circuitry is adapted to perform the first set integrity check on a predetermined address in the memory by: setting the seed value to a predetermined value, and transmitting a memory write request comprising the pseudo-random number to the point-of-trust circuitry via the first set of intermediate circuits; and the point-of-trust circuitry is adapted to perform the first set integrity check on the predetermined address in the memory by: resetting the seed value to the predetermined value, and comparing the pseudo-random number in the memory write request received by the point-of-trust circuitry to an output of the generation circuitry. A first set integrity check may be carried out as part of the integrity check. The first set integrity check checks an integrity of the first set of intermediate circuits. In this case, the processing circuitry issues a write request containing the pseudo-random number to the point-of-trust circuitry via the first set of intermediate circuits. Having received the write request, the point-of-trust circuitry compares the data values that are received in the write requests with output of the generation circuitry having reset the seed value. In this way, the integrity of the first set of intermediate circuits can be tested by determining whether the values sent in write requests by the processing circuitry correspond with the same data values that are received by the point-of-trust circuitry. Again, since the data values provided in the write requests are "random", they cannot be anticipated by the first set of intermediate circuits that lack access to the generation circuitry and its seed value. However, since the data values are pseudo-random, they can be regenerated given the seed value. Note that there are a number of ways in which both the processing circuitry and the point-of-trust circuitry can make use of generation circuitry. Each of the processing circuitry and the point-of-trust circuitry could include its own generation circuitry configured in the same way. In this case, the seed value can be transmitted between the processing circuitry and the point-of-trust circuitry via the secure channel in order to make sure that the data values that are generated at the point-of-trust circuitry correspond with those that are generated at the processing circuitry. Alternatively, a single generation circuit may be shared between each of the processing circuitry and the point-of-trust circuitry, with each of these circuitries having secure access to the generation circuitry. Note that the test can be carried out in parallel for a number of point-of-trust circuitries by using the same seed across a plurality of point-of-trust circuitries.

In some examples, the point-of-trust circuitry is inhibited from responding to the memory write request by writing data to the memory. In particular, there is no need for the write requests that are issued as part of the integrity check to actually involve data being physically written to the memory. Having performed the integrity checks, the memory write requests can be disregarded by the point-of-trust circuitry.

In some examples, the data processing apparatus comprises: a plurality of processing circuitries, including the processing circuitry, wherein at most one of the processing circuitries is adapted to determine whether the addresses in the memory of the memory access requests received via the first set of intermediate circuits has the predetermined relationship based on the correspondence; at most one of the processing circuitries is adapted to perform the integrity check other than the first set integrity check; and each of the processing circuitries is adapted to perform the first set integrity check after being powered up. In these examples, a single one of the processing circuitries is used to perform certain checks, while other checks are performed by each processing circuitry. In particular, one processing circuitry is responsible, when powered up, to perform the first set integrity check to determine that its path through the first set of intermediate circuits is valid and to establish the global mapping of addresses to points of trusts. Other tests need only be performed by a single one of the processing circuitries. In this way, the series of tests leads to a conclusion that the memory system is valid and verified. At the same time, it is possible for individual processing circuitries to be powered on and off and to test their access to the memories circuitry even though the memory itself may currently be in use (e.g. by other processing circuits that have already been powered up).

In some examples, the point-of-trust circuitry is adapted to store at least one predetermined value in at least one corresponding predetermined location in the memory, to calculate a set of integrity values corresponding to the at least one predetermined value, and to separately store the integrity values; and in response to a predetermined event, the point-of-trust circuitry is adapted to calculate a further set of integrity values based on the at least one predetermined value stored in the at least one corresponding predetermined location, and to compare the further set of integrity values to the set of integrity values. After having started up, it is possible for a number of tests to be performed on an ongoing basis to determine whether the memory system is interfered with. In particular, one test is to make use of so-called "canary lines" that are strategically written to areas of memory. The contents of these lines could be predetermined or could be random. In either event, an integrity value is generated that corresponds with the data value that is stored in the lines. These integrity values are then securely stored. In response to a predetermined event (such as the expiration of a timer, a period in which no memory accesses are received, or an explicit signal from the processing circuitry) one or more of these lines is accessed from the memory and the integrity values are recalculated. The recalculated integrity values should correspond with those integrity values that have been securely stored. If not, then this suggests that the data values have been modified while in memory.

In some examples, the set of integrity values and the set of further integrity values are at least one of: a hash value, a cyclic redundancy check value, a checksum, and a keyed-hash message authentication code, produced from the predetermined values. The exact algorithm used to produce the integrity values is one of design choice and several algorithms will be known to the skilled person.

In some examples, the first set of intermediate circuits comprises a switch. A switch can be used in order to transmit messages from one location to another location. Commonly, there are a number of possible sources and/or a number of possible destinations. This enables communications to be transferred from any one of the inputs to any one of the outputs. Examples of switches include interconnects and buses.

In some examples, the plurality of addresses of the memory access requests issued by the processing circuitry are a plurality of logical addresses; and the plurality of addresses of the memory access requests received by the point-of-trust circuitry are a plurality of physical addresses. In these examples, the address space of the logical addresses and the physical addresses are different. That is, that a logical address and a physical address may ultimately refer to the same area of memory, but whereas the physical address may refer to a specific circuit, the logical address may be part of a different (e.g. bigger) address space, which may be translated to the physical address space.

Particular embodiments will now be described with reference to the figures.

Figure 1A:
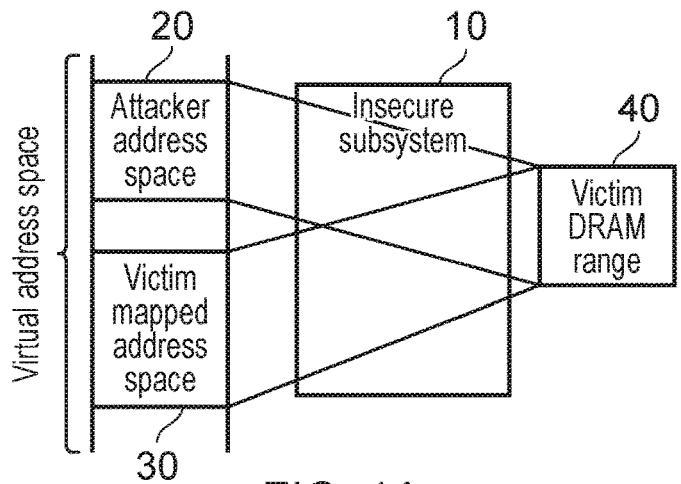
FIG. 1A illustrates an example of an aliasing attack.

There are a number of ways in which intermediate circuitry in, for instance, an interconnected system of requesters and slaves can be used to circumvent memory protection controls in order to gain access to controlled areas of memory or to otherwise subvert a system—either maliciously or as a result of poor programming. FIG. 1A illustrates an aliasing attack (also known as a remapping attack). In this case, the intermediate circuitry can take the form of a memory controller or an interconnect that intermediates the processing circuitry and the memory. In this example, the virtual address space includes a block of memory used by the victim 30. This is mapped to an area of physical DRAM 40. However, the insecure subsystem 10, which is an intermediate circuit and which can take the form of an interconnect or memory controller also causes this area of the DRAM 40 to be mapped to a second area 20 of the virtual address space. That is to say that the physical DRAM 40 can be accessed by either the victim's area of memory 30 or the attacker's area of memory 20. In this way, protections that are set up by a Memory Protection Unit (MPU) can be disregarded. In particular, the attacker may have free reign to access its area of the virtual address space 20, which thereby makes it possible to read the physical DRAM 40, which the victim may understand to be secure.

Figure 1B:
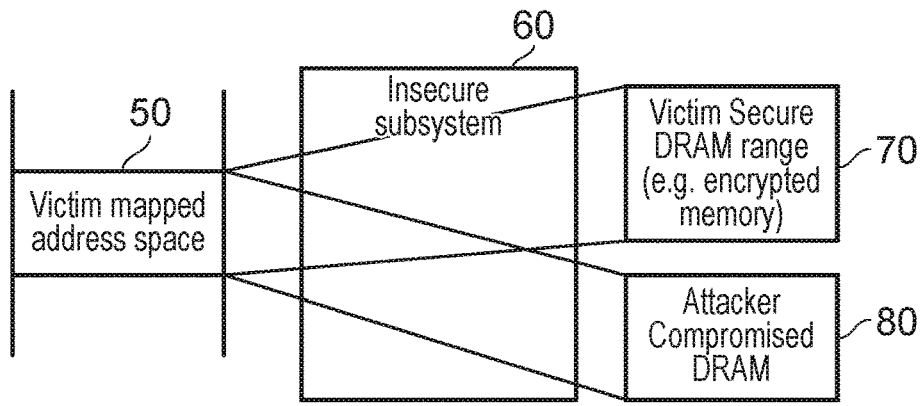
FIG. 1B illustrates an example of a redirection attack.

FIG. 1B illustrates an example of a redirection attack. Here, the insecure subsystem 60 may take the form of an interconnect or other switch, for instance. Ordinarily, the address space 50 used by the victim is mapped by the insecure subsystem 60 to a secure area of the DRAM 70. During this process, data that is sent to the victim's DRAM 70 could be encrypted so that it cannot be accessed by another process. However, in this example, the insecure subsystem 60 causes transactions to instead be transmitted to an area of the DRAM that is compromised by the attacker 80. If this DRAM does not utilise encryption, then the contents of the transaction can be freely read by the attacker at a later time.

Figure 1C:
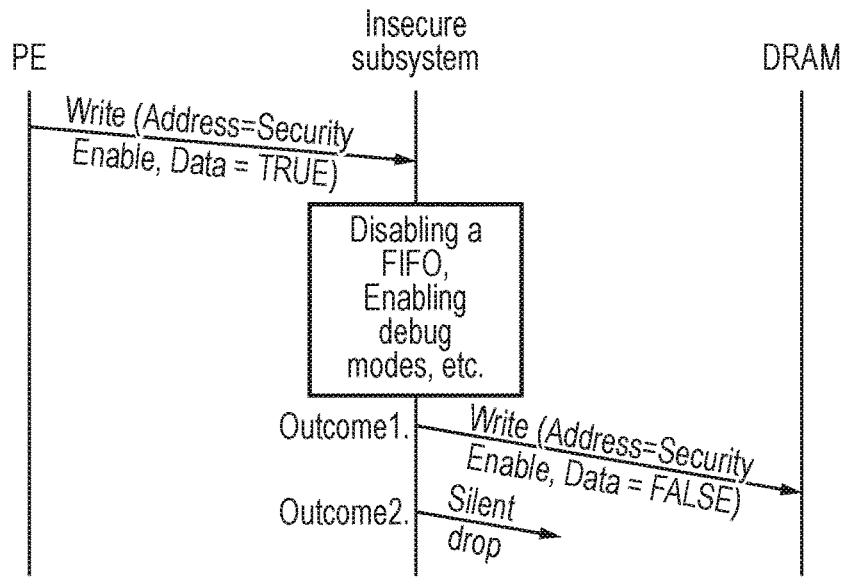
FIG. 1C illustrates an example of an interconnect corruption attack.

FIG. 1C illustrates an example of an interconnect corruption attack, which can be used to corrupt data. In this example, a processing element issues a write request to the insecure subsystem. The write request in this example is to an address that controls whether security is enabled or not, and the data value is set to TRUE to indicate that security should be enabled. Here, there are a number of actions that the insecure subsystem could take. For instance, the insecure subsystem could disable a First In First Out (FIFO) queue, or otherwise enable debug modes, which make it possible for the data to become corrupted. A number of possible outcomes can be achieved in order to achieve the effect of preventing the security mode from being enabled. In a first outcome, the data that is produced by the insecure subsystem is simply a write request with the data set to FALSE rather than TRUE. In this way, the security is not enabled. A second outcome is to simply drop the write request silently. Consequently, the write request is not issued from the insecure subsystem to the DRAM and so the security mode is not set to TRUE.

It will be appreciated that other attacks to subvert either the addressing process or the data writing process can be performed.

FIG. 2 illustrates a System-on-Chip (SoC), which communicates with a plurality of memories 190a, 190b, 190c via corresponding memory ports 180a, 180b, 180c. The SoC communicates with the ports 180a, 180b, 180c of the memories 190a, 190b, 190c via memory controllers 170a, 170b, 170c. These memory controllers are said to be untrusted since they may be provided by a different entity to the one that provides other elements of the SoC. Each of the memory ports 180a, 180b, 180c is therefore associated with a point-of-trust circuit 150a, 150b, 150c, which is provided by the SoC provider. The point-of-trust circuits 150a, 150b, 150c are connected to an interconnect 140. Again, the interconnect 140 is said to be untrusted since it is not provided by the SoC provider. Also connected to the interconnect are one or more processing clusters 130a, 130b. In this example, there are shown to be two such clusters 130a, 130b. The first cluster includes a pair of processing circuits in the form of CPUs 100a, 100b. Similarly, the second processing cluster 130b also includes a pair of CPUs 100c, 100d. Each of the CPUs 100a, 100b, 100c, 100d executes management software, which manages the execution of a number of tests that are performed in order to determine the trustworthiness of the interconnect 140 and the memory controllers 170a, 170b, 170c. Note that in this example, each of the CPUs 100a, 100b, 100c, 100d includes a corresponding Memory Protection Unit (MPU) 120a, 120b, 120c, 120d. The MPUs are responsible for translating logical memory addresses provided by the corresponding CPU to a physical address that can be understood by the memory controllers 170a, 170b, 170c. In addition, the MPUs are responsible for enforcing an element of security such as restricting which of the memories 190a, 190b, 190c and which parts of those memories 190a, 190b, 190c can be accessed.

Each of the CPUs 100a, 100b, 100c, 100d includes a secure channel to each of the point-of-trust circuits 150a, 150b, 150c. The secure channels make it possible to transmit a small amount of configuration information to the point-of-trust circuits 150a, 150b, 150c securely. In particular, the data that is transferred cannot be intercepted or modified by, for instance, the interconnect 140. That is to say that the interconnect 140 is unable to modify data that is sent through the secure channel as a consequence of software/dynamic configuration values. In other embodiments, the secure channels pass through the interconnect 140 and security is achieved by means of encryption. In particular, each of the processing circuits 100a, 100b, 100c, 100d could be capable of encrypting messages that can be decrypted by the relevant point-of-trust circuit 150a, 150b, 150c. In some other examples, the secure channel completely avoids the interconnect 140 altogether and separate circuitry is provided to enable the secure communication to take place.

In this embodiment, each of the CPUs 100a, 100b, 100c, 100d includes a pseudo-random number generator 110a, 110b, 110c, 110d. Furthermore, each of the point-of-trust circuits 150a, 150b, 150c includes a pseudo-random number generator 160a, 160b, 160c. A pseudo-random number generator is able to produce a stream of numbers with the appearance of randomness. In practice, however, the stream of numbers is dictated by the provision of a seed value. In this way, if the seed value is unknown, then the stream of numbers that originate from the pseudo-random number generator can be treated as being random. However, if the seed value is known, then the series of values that are produced can be predicted. Accordingly, if each of the pseudo-random number generators 110a, 110b, 110c, 110d in the processing circuits 100a, 100b, 100c, 100d match the same seed value as the pseudo-random number generators 160a, 160b, 160c of the point-of-trust circuits 150a, 150b, 150c then each generator will produce the same stream of random numbers.

FIG. 3 illustrates an overview of the validation process. The validation process is made up of two sets of tests. The first set of tests is performed when the System-on-Chip is started up. This set of tests is made up of three phases. The second set of tests are made periodically while the system remains active and is used to provide continuing validation of the memory system. Within this overview, a pair of processing circuits (PE1, PE2) are provided. These are connected to an interconnect, to which a first point-of-trust circuit and second point-of-trust circuit (POT1, POT2) are provided. The point-of-trust circuits (POT1, POT2) act as hardware validation agents for two physical memories (DRAM1, DRAM2). In particular, the first point-of-trust circuit (POT1) is associated with the first DRAM (DRAM1) and the second point-of-trust circuit (POT2) is associated with the second DRAM (DRAM2). In this example, the interconnect circuitry as well as memory controllers that exist between the point-of-trust circuits and the DRAM are initially untrusted since they have been provided by a third party.

The first phase is performed by a single processing circuit. In this, one or more access requests are sent to each of the point-of-trust circuits. In some embodiments, the series of access requests is set so as to cover the entirety of the memory address space. Since each access request returns a predetermined amount of data, each of the addresses of the access requests is separated by a stride value. For instance, each access request may return 64 bits of data. Consequently, each of the addresses of the access requests is also separated by 64 bits-64 bits being referred to as the stride length. At the point-of-trust circuits, each point-of-trust circuitry checks the relationship of the addresses that are received. The stride value (which can be communicated via the secure channel) should be clear from the addresses of the access requests that are received at each point-of-trust circuit. For instance, each of the addresses may be separated by the same stride value. In other examples, where memory striping may be used to distribute memory addresses evenly between multiple memories, each of the addresses of the access requests received at one of the point-of-trust circuits may be separated by a multiple of the stride value. For instance, in this example, two memories are provided. If memory striping was in use, then the addresses received by each of the point-of-trust circuits could be expected to be double the stride value. The stride value can be communicated using a secure channel so that the relationship can be checked at the point-of-trust circuits. In addition to checking these relationships, each of the point-of-trust circuits determines boundary information for the requests that it receives. In particular, each point-of-trust circuit determines an upper bound and a lower bound for each of the access requests that is received by that point-of-trust circuit. These are then communicated back to the processing element conducting the test (PE1). This information can also be transmitted using the secure channel. Having received the bounds information, the processing element then determines the validity of the bounds. In particular, there should be no memory address that is covered by multiple memories (which would indicate aliasing is in effect). In addition, there should be no memory addresses for which any gap occurs (i.e. for which no memory applies). Note that this is not necessarily as simple as simply determining whether the bounds information provided by each point-of-trust circuit overlaps. In particular, overlapping may legitimately occur in a situation where memory striping occurs. It is therefore necessary to consider whether, despite features such as memory striping, there are memory violations that could lead to an address referring to multiple physical memories, or an address that does not refer to any memory (for instance).

The first phase therefore seeks to determine whether memory access requests that are received have an appropriate pattern in respect of their access addresses. The presence of an inappropriate pattern (e.g. where the relationship between the access requests cannot be determined, or suddenly changes or where certain memory addresses are related to multiple memories or no memories) may be indicative of memory aliasing or another attack being performed at the interconnect.

The second phase considers the connectivity between the point-of-trust circuits and the DRAM. In particular, each link between the point-of-trust circuitry and its associated memory is tested. Such tests may be carried out in parallel. Here, the pseudo-random number generator of the point-of-trust circuitry is initialised to a given seed value. The same seed value can be issued to each point-of-trust circuitry. This is used to generate a stream of random numbers which are then written to the associated DRAM. The pseudo-random number generator is then reinitialised with the seed value and the data is read back. Each of the data items should correspond with the next value produced by the pseudo random number generator. This makes it possible to determine whether data is corrupted or changed by, for instance, a memory controller. In particular, if such a change occurs, then the data that is read back will not correspond with the output from the pseudo-random number generator after having been reinitialised. The stride value, which indicates the extent to which write requests are made, can be selected so as to implicitly perform scrubbing of DRAM content, which may be valuable for other security considerations (such as inhibiting cold-boot attacks). For instance, the second phase can simply be used to determine whether aliasing is being performed or whether data is being corrupted. The second phase can also confirm that the DRAM is 'alive' (e.g. it is not simply ROM). In this case, the stride can be set so that writes occur to the first byte of each cache line (e.g. 64 bytes) or page (4 kB) within the address range. However, the second phase can also be used to scrub DRAM so that secret data from a previous boot cycle is not visible in the current boot cycle. In this case, the stride can be configured so that a write is performed on each byte and the data is 'zeroed'.

The third phase is carried out by each processing circuit once it is powered on. This could be when the entire system starts up, but could also be delayed by some processing circuits. In this case, one or more write requests are issued from the processing circuitry to each point-of-trust circuit. Each of the write requests takes the next value from the pseudo-random number generator of the processing element. The point-of-trust circuitry is initialised to use the same random seed value so that the numbers generated by its pseudo-random number generator will correspond with those provided at the processing circuit. In this way, the point-of-trust circuitry is able to check the validity of each of the data elements provided in the write requests to determine whether any corruption occurs at, for instance, the interconnect. Note that the seed value for the pseudo-random number generator can be communicated via the secure channel. The point-of-trust circuitry is such that the write request is quashed (e.g. not forwarded to the memories). As a consequence, the third phase can be carried out at any time when a processing circuit powers on, since the memory, which may be in use by other processing circuits, is not physically changed as a consequence of this test. The point-of-trust circuits can check that the received write requests have an appropriate stride value (given the considerations mentioned earlier) and that the write requests are issued across the entire range of space for which that point-of-trust circuit is responsible.

Runtime checks are performed periodically while the system executes. In particular, as a first test, if a further access request is issued from any processing element to a memory via the point-of-trust circuitry, then that point-of-trust circuitry will determine whether the access address in that further access request corresponds with the bounds that were calculated for that point-of-trust circuitry during the first phase. If a point-of-trust circuit receives a further access request that is outside this range, then this is indicative that the point-of-trust circuitry has received a memory access request that it should not have done. This may be indicative of an aliasing attack and consequently an error is raised. The second runtime test that is shown in FIG. 3 is the use of so-called canary lines. This involves writing data to one or more strategic locations in the memory or by tracking data that is externally written to these locations. Strategic locations could include the beginning and ending of the memory, random locations within the memory, and near borders of sections of memory belonging to different entities or having different permissions. An integrity check algorithm is used to produce an integrity value for the data that has been written. Examples of such algorithms include hash algorithms as well as CRC algorithms and HMAC algorithms. Such algorithms produce an integrity value that changes as a consequence of even a minor change to the underlying data. The integrity values are securely stored. For instance, these could be stored within a storage circuit of the point-of-trust circuitry, or could be stored securely in main memory. In any event, at particular intervals, those lines of memory are read back by the point-of-trust circuitry and the integrity checks are re-performed. The integrity values that are recalculated should match with the values that have been stored. If not, then this is indicative that the data stored within the memory has been modified. Consequently, an error is raised (such as an exception). Note that in the example of FIG. 3, only a single point-of-trust circuit is illustrated as performing the bounds check and the canary line checks. However, these checks may be performed by each point-of-trust circuit in respect of its own memory.

FIG. 4 illustrates a flow chart 400 that shows the first phase of validation in detail in accordance with some embodiments. The process begins at step 405, where access requests are issued to one or more memory addresses, each of which is separated by a stride value. At step 410, the requests are received at the relevant point-of-trust circuits. At step 415, configuration information is received via the secure channel. This configuration information includes the stride value as well as other information that is necessary to confirm the validity of the relationship of the memory addresses that are received at the point-of-trust circuits. For instance, this may include information such as whether memory striping is in effect, and the number of other memory units that are present. At step 420, the upper and lower bounds of the addresses referred to by the memory access requests are determined. At step 425, it is determined, using the configuration information, whether the relationship between the addresses of the memory access requests is valid. In other words, given what is known about the configuration of the system, it is determined whether the relationship between the addresses in the received requests corresponds with the relationship of the outgoing requests that are issued by the processing circuitry. Not that there may not be an exact match, since the addresses may have been translated between address spaces. If not, then at step 430, the test is failed and an error is raised. This could, for instance, take the form of raising an exception. If the relationship is considered to be valid, then at step 435, the relationship validity and the bounds information is transmitted to the processing element/processing circuit that issued the access requests. At step 440, the processing circuit that received the validity information and bounds information from each point-of-trust circuit determines whether there are any memory addresses in the address space that are not mapped to one of the memories. If there is an address directed towards two memories or zero memories, for instance, then the test is failed and an error is raised at step 445. Otherwise, the test passes at step 450.

The relationship between addresses of successive requests could be expected to be:

Address=Previous Address+STRIDE

Where striping is used, the relationship between addresses of successive requests could be expected to be:

Address=Previous Address+STRIDE*N (to account for linear striping across N DRAM ports)

As another example, where hash-based striping is used, the relationship might be:

Address mod STRIDE*N=Previous Address mod STRIDE*N+STRIDE*N (to account for hash-based striping across N DRAM ports)

FIG. 5 illustrates a flow chart 500 that shows an example of the operation of the second phase of validity testing. The process begins at step 505 where the pseudo-random number generator used by a point-of-trust circuit is initialised with a seed value. The exact seed value that is used us not material provided that the value is known. Note that this test can be performed in parallel by each point-of-trust circuit. Either the same seed value could be used by a plurality of pseudo-random number generators at a plurality of point-of-trust circuits or a single generator could be used by each point-of-trust circuit. At step 510, a loop counter (n) is initialised to 0. At step 515, a next output is obtained from the pseudo-random number generator and this is sent in the form of a write request towards the memory. In practice, such a write request could be expected to pass through one or more other intermediate circuits such as a memory controller. At step 520, it is determined whether the loop counter has reached a given value (N), which corresponds to the number of write requests that are to be issued. If the number of write requests has not yet been fulfilled, then the process proceeds to step 525 where the loop counter (n) is incremented, and the process proceeds to step 515. Otherwise, the process proceeds to step 530 where the pseudo-random number generator is reinitialised with the previous seed value. As a consequence of this, the series of numbers that are generated by the pseudo-random number generator will correspond with the numbers that were previously generated at step 515. At step 535, the loop counter (n) is reset to 0. At step 540, a read request is then issued by the point-of-trust circuitry. The read request is issued to an address in memory that corresponds with one of the addresses to which a write request was previously issued at step 515. In other words, the read request issued in step 540 reads the data that was written in previous step 515. At step 545, the next number is obtained from the pseudo-random number generator. Step 550 then determines whether there is a match between the output of the pseudo-random number generator and the number that has been obtained from the read request. In theory, since the same seed value is being used, the two numbers should match. If there is no match then at step 555 the test fails and an error is raised. This is because the value that was stored in the memory is perceived to have been corrupted. If there is a match, then at step 560, it is determined whether the loop is to continue. If the loop is to continue, then the process proceeds to step 565 where the loop counter (n) is incremented and the process proceeds to step 540 to issue the next read request. Otherwise, with no failure having occurred, the test passes at step 570.

FIG. 6 illustrates a flow chart 600 that shows the process of the third phase of the validity testing. The process begins at step 605, where the pseudo-random number generator of the processing circuit is initialised with a seed value. The exact seed value that is used is not important, provided its value is known. Each processing circuit can perform this test in parallel and hence can use the same random number generator if desired. At step 610, a loop counter (n) is initialised to 0. At step 615, the next output from the pseudo-random number generator is obtained, and this is sent via a write request to the point-of-trust circuitry. Step 620 asks whether the loop is to continue or not. If so, then at step 625, the loop counter (n) is incremented and the process returns to step 615. If the loop is complete, then at step 630, the pseudo-random number generator of the point-of-trust circuitry is initialised to the same seed value as was used in step 605. The seed can be transmitted, for instance, across the secure channel that exists between the processing circuitry and the point-of-trust circuitry. Accordingly, the pseudo-random number generator of the point-of-trust circuitry should produce the same series of numbers that were produced during step 615. At step 635, the loop counter is again reset to 0 and at step 640, the next write request that was issued by the processing circuitry is received by the point-of-trust circuitry. At step 645, the next output of the pseudo-random number generator is obtained. At step 650, it is determined whether there is a match between the number produced by the local pseudo-random number generator in the point-of-trust circuitry and the value written in the write request issued by the processing circuitry. If not, then the test fails at step 655 and an error is raised. This is because it can be anticipated that the data value has been corrupted during transmission (e.g. by the interconnect). If there is a match, then at step 660 it is determined whether the loop has further iterations to be performed. If so, then at step 665 the loop counter (n) is incremented and the process returns to step 640. Otherwise, the test passes at step 670.

Note that in this example, the receiving process (steps 630 to 660) is carried out after the outputting process (steps 605 to 620). However, it will be appreciated that these two processes can be carried out in parallel. In particular, the pseudo-random number generator(s) used by the processing circuit and the point-of-trust circuitry can be simultaneously initialised with the same seed value. An output from the PRNG can be obtained by the processing circuit and sent in a write request (to the point-of-trust circuitry (step 615) where it can be received (step 640) and compared to an output of the PRNG output (step 645). If there is not a match, then an error is raised (step 655). Otherwise, if there are more iterations of the loop to be performed, the process repeats with another output from the PRNG being sent to the point-of-trust circuitry and the point-of-trust circuitry comparing the received data to the output of the PRNG. If, at the end of the loop, all received packets have been confirmed as valid then the test passes at step 670. In this way, only a single loop is required.

FIG. 7 illustrates a flow chart 700 that shows a process of performing the runtime tests. The process begins at step 705 where canary lines are written to the memory. Such lines may be written at strategic locations such as locations that are more prone to being corrupted, locations near to where sensitive data is stored, and locations on the boundary between areas of memory with different permissions. At step 710, integrity calculations are performed on the data that is written to the memory. At step 715, the integrity data that is generated as a result of the integrity calculation is stored. This could be stored, for instance, in the point-of-trust circuitry itself. The remainder of the flow chart 700 then relates to a loop that may be continued while the point-of-trust circuitry is active. At step 720, it is determined whether an access request has been received. If so, it is determined whether the address referenced in the memory access request falls within the range that was calculated during the first phase for this point-of-trust circuitry. If not, then an error is raised at step 730 as a consequence of the point-of-trust circuitry receiving a memory access request that it should not have received. Otherwise, the memory access request is fulfilled at step 735 and the process proceeds to step 740. The process also proceeds to step 740 if, at step 720, no access request was received. At step 740, it is determined whether a timer has expired. Many runtime attacks cause a disruption of memory of hundreds of milliseconds and can cause the corruption of multiple cache lines. Consequently, by setting a timer with a frequency less than this, and by strategically placing data in canary lines, it is possible to say with reasonable probability as to whether a corruption of the data has occurred or not. At step 740, if the timer has not expired, then the process returns to step 720. Otherwise, at step 745, the data stored in the canary lines is accessed. At step 750, integrity calculations are performed on the data that has been accessed from the memory in the canary lines. At step 755, it is determined whether the results of the integrity calculations match the stored integrity data. If not, then an error is raised at step 760 to represent the fact that the data has been corrupted during storage. Otherwise, at step 765, the timer is reset and the process returns to step 720.

Accordingly, the above description illustrates how it is possible to perform a series of checks so that untrusted elements of a memory system can be trusted with reasonable probability. The process is such that individual processing circuits can be brought online at any time and it can be determined whether the interface between those processing circuits and the memory system can be trusted, without corrupting memory or having to temporarily disable other processing circuits in order to perform the testing.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A data processing apparatus comprising:
processing circuitry configured to issue a plurality of memory access requests to a plurality of addresses in a memory;
point-of-trust circuitry configured to receive the memory access requests from the processing circuitry via a first set of intermediate circuits; and,
secure channel circuitry configured to enable secure communication of a predetermined correspondence between the plurality of addresses from the processing circuitry to the point-of-trust circuitry,
wherein the point-of-trust circuitry is configured to determine whether the addresses in the memory associated with the memory access requests received via the first set of intermediate circuits have a relationship based on the predetermined correspondence communicated over a secure channel using the secure channel circuitry.

2. The data processing apparatus according to claim 1, wherein data sent via the secure channel is unaffected by a configuration of the first set of intermediate circuits.

3. The data processing apparatus according to claim 1, wherein the point-of-trust circuitry is configured to determine a range of addresses of the memory to which the memory access requests are addressed and to provide the range of addresses to the processing circuitry via the secure channel; and
the processing circuitry is configured to determine, from the range of addresses, whether the memory comprises an invalid address.

4. The data processing apparatus according to claim 3, wherein the invalid address is one to which multiple memories relate.

5. The data processing apparatus according to claim 3, wherein the invalid address is one to which no memory relates.

6. The data processing apparatus according to claim 3, wherein the point-of-trust circuitry is configured, in response to the point-of-trust circuitry receiving a further memory request to an address that falls outside the range of addresses, to signal an error.

7. The data processing apparatus according to claim 1, further comprising:
generation circuitry configured to generate a pseudo-random number based on a seed value, to perform an integrity check.

8. The data processing apparatus according to claim 7, wherein the point-of-trust circuitry is configured to forward the requests to the memory via a second set of intermediate circuits.

9. The data processing apparatus according to claim 8, wherein the second set of intermediate circuits comprises a memory controller.

10. The data processing apparatus according to claim 8, wherein:
the integrity check comprises a second set integrity check; and
the point-of-trust circuitry is configured to perform the second set integrity check on a predetermined address in the memory by:
setting the seed value to a predetermined value;
transmitting a memory write request comprising the pseudo-random number to the predetermined address via the second set of intermediate circuits;
resetting the seed value to the predetermined value;
transmitting a memory read request to the predetermined addresses in the memory via the second set of intermediate circuits; and,
comparing a result of the memory read request with the pseudo-random number.

11. The data processing apparatus according to claim 10, wherein the integrity check is configured to be performed for a plurality of addresses by performing a plurality of memory write requests including the memory write request, followed by a plurality of memory read requests including the memory read request; and the pseudo-random number is changeable for each of the plurality of memory write requests and each of the plurality of memory read requests, based on the seed value.

12. The data processing apparatus according to claim 7, wherein the integrity check comprises a first set integrity check; and the processing circuitry is configured to perform the first set integrity check on a predetermined address in the memory by:
setting the seed value to a predetermined value;

transmitting a memory write request comprising the pseudo-random number to the point-of-trust circuitry via the first set of intermediate circuits; and, the point-of-trust circuitry is configured to perform the first set integrity check on the predetermined address in the memory by:

resetting the seed value to the predetermined value; and, comparing the pseudo-random number in the memory write request received by the point-of-trust circuitry to an output of the generation circuitry.

13. The data processing apparatus according to claim 12, wherein the point-of-trust circuitry is configured to be inhibited from responding to the memory write request by writing data to the memory.

14. The data processing apparatus according to claim 12, comprising:

a plurality of processing circuitries, including the processing circuitry, wherein at most one of the processing circuitries is configured to determine whether the addresses in the memory associated with the memory access requests received via the first set of intermediate circuits has the relationship based on the predetermined correspondence communicated over the secure channel using the secure channel circuitry;

at most one of the processing circuitries is configured to perform the integrity check other than the first set integrity check; and, each of the processing circuitries is configured to perform the first set integrity check after being powered up.

15. The data processing apparatus according to claim 1, wherein the point-of-trust circuitry is configured to store at least one predetermined value in at least one corresponding predetermined location in the memory, to calculate a set of integrity values corresponding to the at least one predetermined value, and to separately store the integrity values; and, in response to a predetermined event, the point-of-trust circuitry is configured to calculate a further set of integrity values based on the at least one predetermined value stored in the at least one corresponding predetermined location, and to compare the further set of integrity values to the set of integrity values.

16. The data processing apparatus according to claim 15, wherein the set of integrity values and the set of further integrity values are at least one of:

a hash value;

a cyclic redundancy check value;

a checksum; and, a keyed-hash message authentication code, produced from the predetermined values.

17. The data processing apparatus according to claim 1, wherein the first set of intermediate circuits comprises a switch.

18. The data processing apparatus according to claim 1, wherein the plurality of addresses of the memory access requests issued by the processing circuitry are a plurality of logical addresses; and, the plurality of addresses of the memory access requests received by the point-of-trust circuitry are a plurality of physical addresses.

19. A data processing method comprising:

issuing a plurality of memory access requests to a plurality of addresses in a memory;

receiving the memory access requests from the processing circuitry via a first set of intermediate circuits at point-of-trust circuitry;

enabling secure communication of a predetermined correspondence between the plurality of addresses from the processing circuitry to the point-of-trust circuitry; and determining whether the addresses in the memory of the memory access requests received via the first set of intermediate circuits have a relationship based on the predetermined correspondence communicated over a secure channel.

* * * * *